United States Patent [19]
Mottate

[11] Patent Number: 5,232,288
[45] Date of Patent: Aug. 3, 1993

[54] STRESS RELIEVED LINEAR MOTION GUIDE UNIT

[75] Inventor: Tatsuo Mottate, Saitama, Japan

[73] Assignee: Nippon Thompson Co., Ltd., Japan

[21] Appl. No.: 878,808

[22] Filed: May 5, 1992

[30] Foreign Application Priority Data

May 8, 1991 [JP] Japan ................................. 3-131608

[51] Int. Cl.⁵ .............................................. F16C 29/06
[52] U.S. Cl. .......................................... 384/45; 384/49
[58] Field of Search ................... 384/7, 10, 22, 37, 38, 384/40–45, 49, 50, 55, 57, 59

[56] References Cited

U.S. PATENT DOCUMENTS

| | | | |
|---|---|---|---|
| 4,396,235 | 8/1983 | Teramachi | 384/44 |
| 4,593,957 | 6/1986 | Hidano | 384/49 |
| 4,611,861 | 9/1986 | Haruyama | 384/49 |
| 4,701,057 | 10/1987 | Kashiwabara | 384/43 X |
| 4,753,540 | 6/1988 | Mottate | 384/7 |

*Primary Examiner*—Thomas R. Hannon
*Attorney, Agent, or Firm*—Skjerven, Morrill, MacPherson, Franklin & Friel

[57] ABSTRACT

A linear motion rolling contact guide unit generally includes a rail, a slider and a plurality of rolling members interposed between the rail and the slider. The rail is elongated in shape and generally U-shaped in cross section. The rail is provided with at least one slot for releasing a stress which may be produced when the rail is subjected to heat treatment during its manufacture.

7 Claims, 4 Drawing Sheets

STRESS RELIEVED LINEAR MOTION GUIDE UNIT

BACKGROUND OF THE INVENTION

1. Field of the Invention

This invention generally relates to a linear motion guide unit, and, in particular, to a rolling contact type linear motion guide unit capable of providing an improved straightness in linear motion.

2. Description of the Prior Art

A rolling contact type linear motion guide unit is well known in the art and it generally includes a slider and a rail 8 as shown in FIGS. 3 and 4. In the conventional guide unit shown in FIGS. 3 and 4, the slider 1 includes a race 2, which is generally in the shape of a horse saddle, and a circulator 3 which is located inside the space defined by the race 2. That is, the race 2 is made out of a thin sheet metal by bending it in a desired form as shown so that it has a generally U-shaped cross section excepting its front and rear end sections. Since the race 2 has a generally U-shaped cross section, it has a flat horizontal section and a pair of vertical sections, each depending from a corresponding side of the horizontal section, and an outer guide groove 5 is provided at an outer side surface of each of the vertical side sections.

The circulator 3 in the illustrated example is comprised of a pair of upper and lower half sections, which are both fixedly attached to the race 2 to construct the slider 1. The circulator 3 is provided with a pair of endless circulating paths, each including a load path section, a return path section 7 and a pair of curved connecting path sections 6 connecting the corresponding ends of the load and return path sections. The load path section is partly defined by the inner guide groove 5 as will become clear later. A plurality of rolling members or balls 4 in the illustrated example are provided in each of the pair of endless circulating paths.

On the other hand, the rail 8 is elongated in shape and has a generally U-shaped cross section so that it includes a bottom section and a pair of vertical sections, each extending upwardly from a corresponding side of bottom section. Typically, the rail 8 is made out of a thin sheet metal by bending it in a desired shape as shown. The rail 8 is provided with an outer guide groove 9 at an inner side surface of each of the vertical sections and a corresponding inner guide groove 5 is brought into alignment with an associated one of the outer guide grooves 9 when the slider 1 is assembled with the rail 8. Thus, when assembled, the load path section of each of the endless circulating paths is defined by a pair of associated inner and outer guide grooves 5 and 9. As a result, the balls 4 located in the load path section are partly received in both of the inner and outer guide grooves 5 and 9 so that a rolling contact is provided between the slider 1 and the rail 8. In addition, since the balls 4 may roll along each of the pair of endless circulating paths endlessly, a theoretically infinite relative linear motion may be provided between the slider 1 and the rail 8.

However, when manufacturing a linear motion guide unit as, for example, shown in FIGS. 3 and 4, the rail 8 is fabricated by bending a relatively thin sheet metal into a desired shape as shown in FIGS. 3 and 4. Then, an intermediate rail thus formed by bending is subjected to heat treatment. In this case, however, it is often the case that a thermal stress is created in the intermediate rail unevenly so that the resulting rail 8 tends to become warped as indicated by the solid lines from an intended straight state indicated by the two-dotted lines in FIG. 3. Such a distortion, of course, deteriorates the degree of straightness of the rail 8 and it could impair the overall performance of the linear motion guide unit. It is true that corrective tempering could be applied to mitigate the distortion, but it only allows to lessen the distortion and does not allow to remove the distortion. Besides, when the rail 8 is required to be relatively long, such an approach is less than satisfactory.

SUMMARY OF THE INVENTION

In accordance with the present invention, there is provided an improved linear motion guide unit including a rail, a slider and a plurality of rolling members interposed between the rail and the slider to thereby allow to provide a relative motion therebetween. In an embodiment, the rail is generally elongated in shape and has a generally U-shaped cross section, including a bottom section and a pair of side sections extending upwardly from the opposite sides of the bottom section. Preferably, the rail is made out of a relatively thin sheet metal by bending it into a desired form to have a generally U-shaped cross section.

In accordance with the principle of the present invention, the rail is provided with at least one stress relieving means for relieving a possible stress produced when the rail is subjected to heat treatment, thereby allowing the rail to have a desired level of straightness when heat treated. Preferably, the stress relieving means includes at least one slot extending in a direction perpendicular to a longitudinal axis of the rail. The slot is preferably provided in the bottom section of the rail extending from one side wall section to the other side wall section. A plurality of such slots may be provided, in which case, a distance between any two adjacent slots should be spaced apart over a distance equal to or less than a predetermined distance.

It is therefore a primary object of the present invention to obviate the disadvantages of the prior art as described above and to provide an improved linear motion guide unit.

Another object of the present invention is to provide an improved rail having a high degree of straightness for use in a linear motion guide unit.

A further object of the present invention is to provide a rolling contact type linear motion guide unit high in accuracy, simple in structure and thus easy to manufacture, and smooth in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
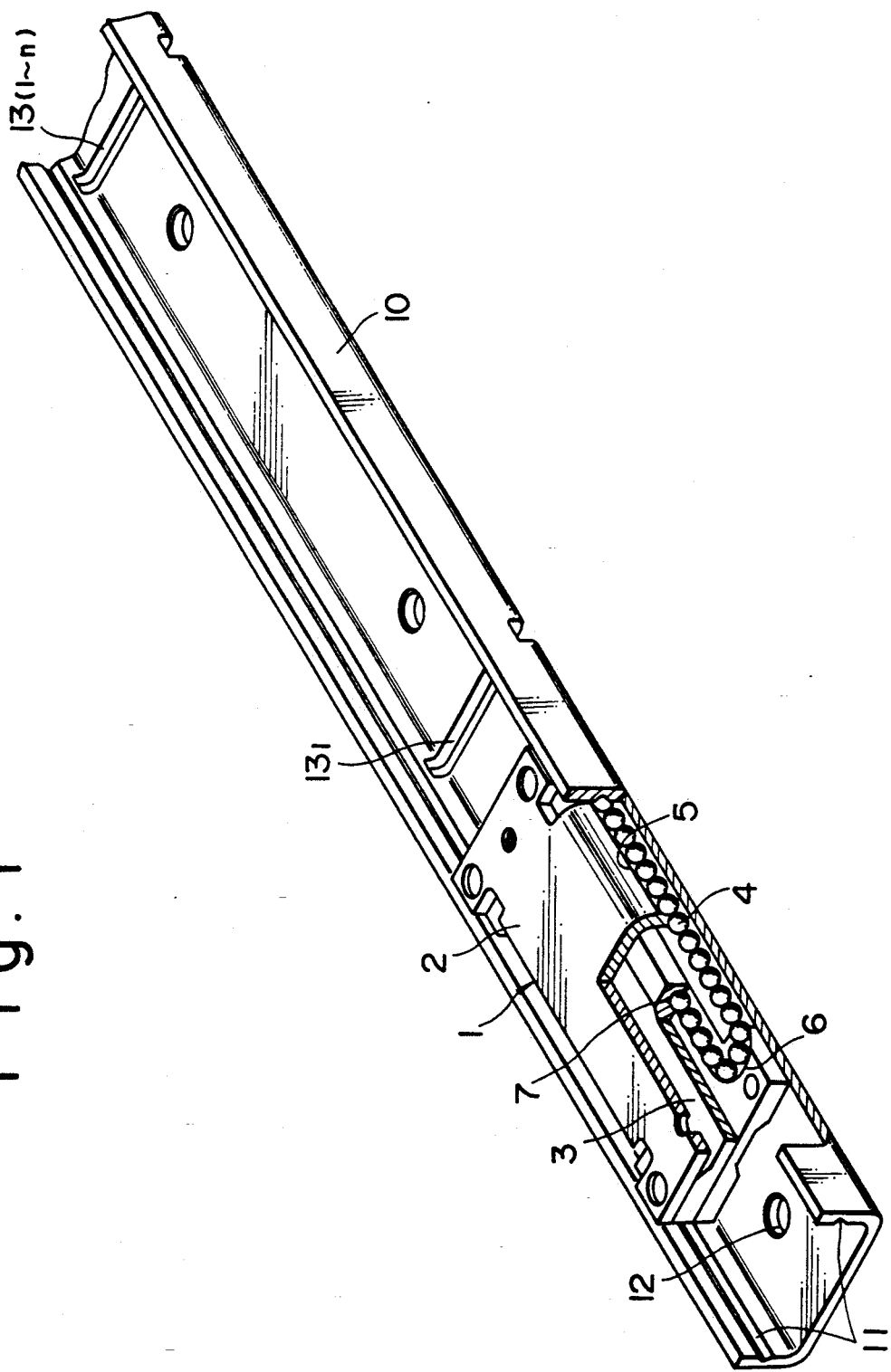
FIG. 1 is a schematic illustration showing in perspective view a linear motion guide unit constructed in accordance with one embodiment of the present invention.
Figure 3:
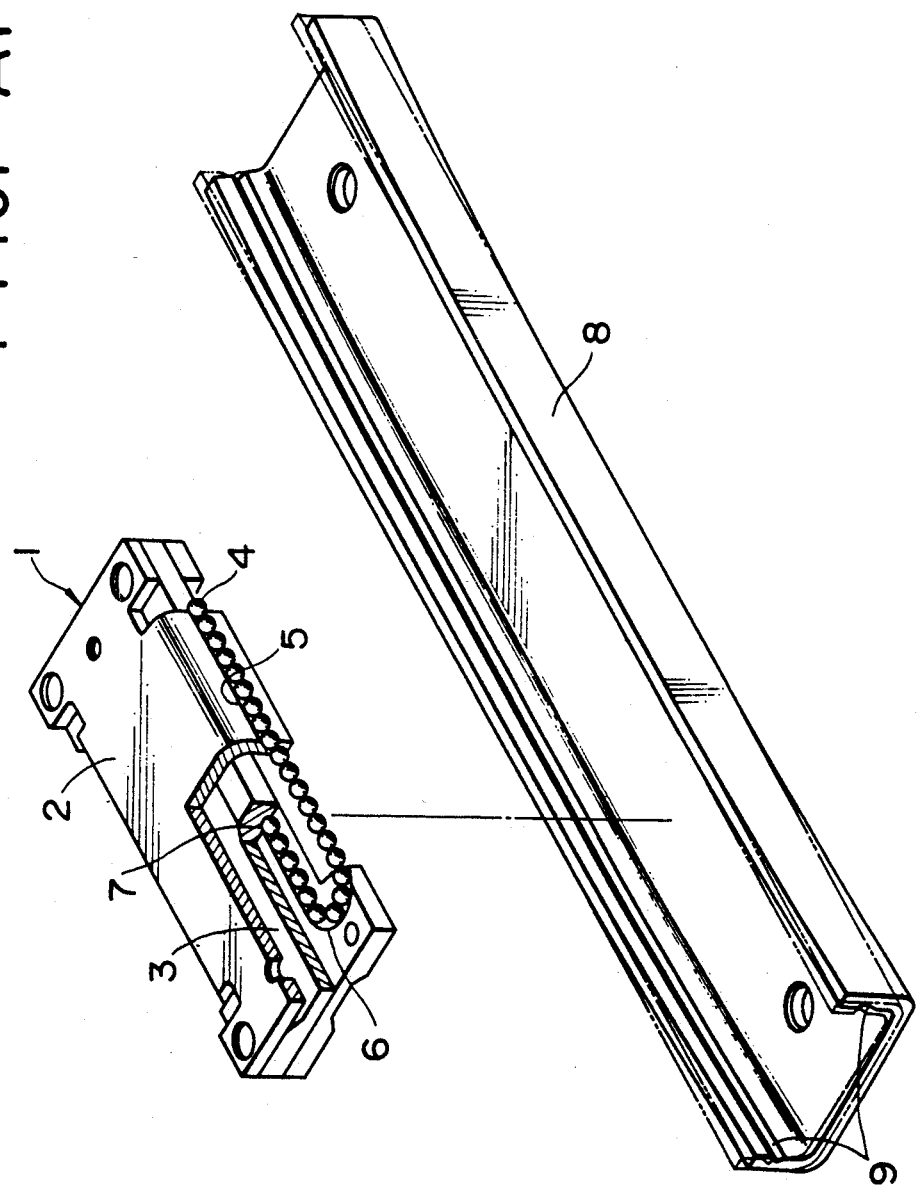
FIG. 3 is a schematic illustration showing in an exploded, perspective view a prior art linear motion guide unit.
Figure 4:
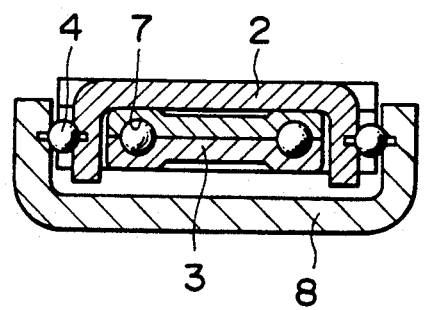
FIG. 4 is a schematic illustration showing in cross sectional view a transverse cross section of the guide unit shown in FIG. 3.

Referring now to FIG. 1, there is schematically shown a rolling contact type linear motion guide unit constructed in accordance with one embodiment of the present invention. Since the present linear motion guide unit shown in FIG. 1 is similar in many respects to the guide unit shown in FIGS. 3 and 4, like elements are indicated by like numerals. Thus, the present linear motion guide unit generally includes a slider 1, a rail 10 and a plurality of rolling members, or balls 4 in the illustrated embodiment, interposed between the rail 10 and the slider 1.

The slider 1 includes a saddle-shaped race 2 having a generally U-shaped cross section and a circulator 3 fixedly attached to the race 2. The race 2 has a top flat section and a pair of vertical side sections depending from the opposite sides of the top section. Each of the side sections has an inner guide groove 5 formed at its outer surface. The slider 1 is provided with a pair of endless circulating paths, each including a load path section, a return path section 7 and a pair of curved connecting path sections 6 connecting the corresponding ends of the load and return path sections. The balls 4 are provided in each of the endless circulating paths.

The rail 10 is elongated in shape and generally U-shaped in cross section, so that it has a bottom section and a pair of side sections extending upward from the opposite sides of the bottom section. Each of the side sections has an inner surface on which an outer guide groove 11 is formed extending in parallel with the longitudinal axis of the rail 10. Thus, the inner guide groove 5 of the slider 1 is brought into alignment with a corresponding outer guide groove 11 to thereby define a load path section of the endless circulating path. Thus, those balls 4 that are located in the load path section are partly received in the inner guide groove 5 and also partly received in the outer guide groove 11. Accordingly, a rolling contact is provided between the slider 1 and the rail 10. Besides, since the balls 4 may roll along the associated endless circulating path endlessly, theoretically speaking, an indefinite relative motion may be provided between the slide 1 and the rail 10.

Figure 2:
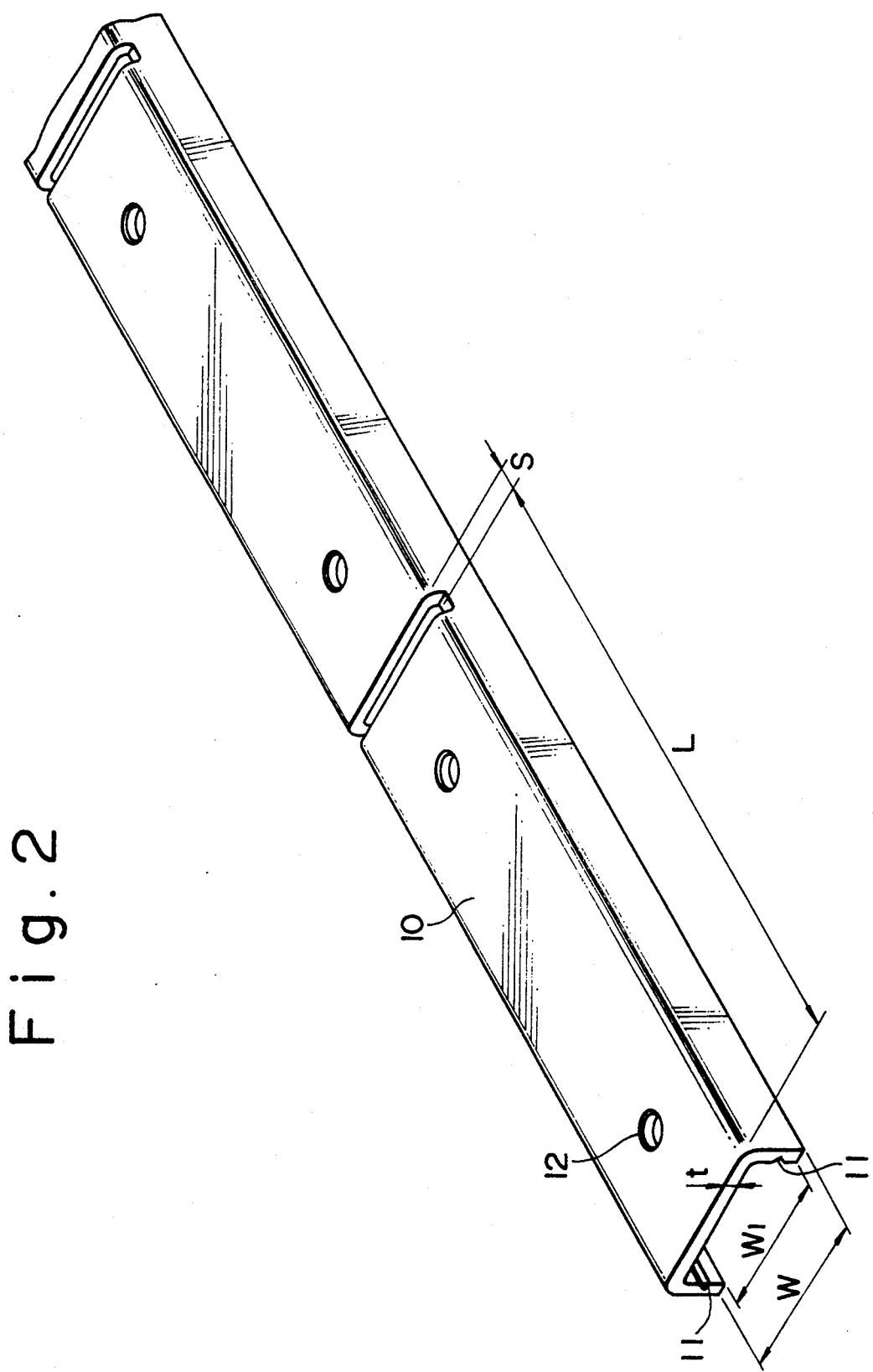
FIG. 2 is a schematic illustration showing in perspective view a rail employed in the guide unit shown in FIG. 1.

As best shown in FIG. 2, the rail 10 is provided with a plurality of mounting holes 12 at the bottom section thereof so that the rail 10 may be fixedly attached to any desired object, such as a main frame of a certain apparatus, by means of bolts or the like. More importantly, the rail 10 is also provided with a plurality of slots or cut-away portions 13 extending in a direction normal to the longitudinal axis of the rail. In a preferred embodiment, the slot 13 is provided in the bottom section extending thereacross from one of the side wall sections to the other side wall sections.

Assuming that the rail 10 has an outer surface to outer surface width W, the first slot 13 is preferably located at a distance L in a range from 4 W to 6 W. The rail 10 may be provided with a plurality of such slots 13, in which case the slots 13 are arranged at a predetermined interval, though they may also be provided at irregular intervals, i.e. slot 13, and slot $13_{(1 \sim n)}$ if desired. Preferably, the slot 13 has a width S which ranges from 1.5 t to 2.0 t with t designating the thickness of the rail 10. Preferably, the length of the slot 13 is larger than an inner width W1 which is a distance between the inner surfaces of the opposed side wall sections.

In manufacture, a piece of sheet metal is cut into a work piece of an elongated shape which is then punch pressed to form a plurality of slots spaced apart from each other over a distance L, and, then, the work piece thus punch pressed is subjected to bending to define a U-shaped cross section having an inner width W1 and an outer width W. The rail 10 thus formed is free of significant distortion even if it is subjected to heat treatment because each of the slots 13 serve as a stress relieving means. Even if a distortion is produced because of such heat treatment, it can be easily corrected automatically when fixedly attached to a desired object, such as a main frame of an apparatus. Thus, the present rail allows to provide a high degree of straightness which in turn allows to provide a high accuracy and smooth operation. Moreover, one of these slots 13 may be used to sever the rail 10 to a desired length.

In the above-described preferred embodiment, a plurality of slots 13 are arranged at an interval between 4 W and 6 W. It is to be noted, however, that a spacing between any two adjacent slots 13 may be made smaller than 4 W because the lower limit of 4 W is not a critical limit, but it is only a practical limit. That is, a distortion due to heat treatment is generally not significant for a length up to 4 W. Thus, if desired or if special heat treatment is required, it is, of course, possible to provide two adjacent slots 13 at a distance smaller than 4 W. In addition, the upper limit may be larger than 6 W depending on the material of the rail 10, required accuracy, the conditions of heat treatment or the like.

While the above provides a full and complete disclosure of the preferred embodiments of the present invention, various modifications, alternate constructions and equivalents may be employed without departing from the true spirit and scope of the invention. For example, use may be made of rollers instead of balls as the rolling members. Therefore, the above description and illustration should not be construed as limiting the scope of the invention, which is defined by the appended claims.

What is claimed is:

1. A linear motion guide unit, comprising:
   an elongated rail;
   a slider slidably mounted on said rail;
   a plurality of rolling members interposed between said rail and said slider;
   said rail including at least one stress relieving means for preventing said rail from being distorted when subjected to heat treatment; and
   wherein said rail is generally U-shaped in cross section and thus includes a bottom section and a pair of side sections extending generally upward from opposite sides of said bottom section.

2. The guide unit of claim 1, wherein said rail is made out of a relatively thin sheet metal by bending.

3. The guide unit of claim 2, wherein said stress relieving means includes a slot provided in said bottom section of said rail extending in a direction normal to a longitudinal axis of said rail.

4. The guide unit of claim 3, wherein said slot extends across said bottom section from one of the side sections to the other.

5. The guide unit of claim 4, wherein a plurality of said slots are provided in said rail arranged such that any two adjacent slots is spaced apart over a distance ranging from 4 W to 6 W with W designating an outer width of said rail.

6. The guide unit of claim 4, wherein said slot has a width ranging from 1.5 t to 2.0 t with t designating a thickness of said rail.

7. The guide unit of claim 1, wherein said slider is provided with a pair of endless circulating paths in which said plurality of rolling members are provided.

* * * * *